United States Patent [19]
Akami et al.

[11] 3,942,154
[45] Mar. 2, 1976

[54] METHOD AND APPARATUS FOR RECOGNIZING COLORED PATTERN

[75] Inventors: Hitoshi Akami, Yokohama; Shigeru Nishikawa, Kanagawa; Tatsuya Kawakami, Tokyo, all of Japan

[73] Assignee: Agency of Industrial Science & Technology, Tokyo, Japan

[22] Filed: June 28, 1974

[21] Appl. No.: 484,178

[30] Foreign Application Priority Data
July 6, 1973   Japan.............................. 48-76342

[52] U.S. Cl............. 340/146.3 B; 250/226; 356/77; 356/96; 356/179
[51] Int. Cl.² .......................................... G06K 7/12
[58] Field of Search ...... 250/226, 559, 571; 356/77, 356/81, 93–98, 178, 179, 195; 66/1 R, 50 B; 340/146.3 B; 234/89; 139/318

[56] References Cited
UNITED STATES PATENTS

| | | |
|---|---|---|
| 3,100,264 | 8/1963 | Jaffe et al. ............................ 356/96 |
| 3,555,852 | 1/1971 | Stock et al. ................... 340/146.3 B |
| 3,578,976 | 5/1971 | Schunack............................ 250/226 |
| 3,621,250 | 11/1971 | Wetzstein ........................... 250/226 |
| 3,663,813 | 5/1972 | Shaw................................... 250/226 |
| 3,814,932 | 6/1974 | Anati et al. ......................... 250/226 |
| 3,829,218 | 8/1974 | Alyanak................................ 356/77 |
| 3,858,044 | 12/1974 | Frappe................................ 250/226 |

*Primary Examiner*—Leo H. Boudreau
*Attorney, Agent, or Firm*—Lane, Aitken, Dunner & Ziems

[57] ABSTRACT

The colors of individual picture elements in a fabric pattern design are encoded by comparing the level of transmittance or reflectance of the picture element at preselected wavelengths with stored values representing a reference color to generate a multibit code indicative of the color of the picture element. A comparator used for this purpose incorporates an error either proportional to the wavelength or of constant value so that the output of the comparator will indicate identity with the stored value if the input value for the picture element is within a certain range of the stored value.

8 Claims, 5 Drawing Figures

METHOD AND APPARATUS FOR RECOGNIZING COLORED PATTERN

BACKGROUND OF THE INVENTION

This invention relates to a formation of colored pattern on a woven fabric and, more particularly, to a method and apparatus for recognizing such a colored pattern.

In a conventional colored pattern forming system a preselected design of colored pattern is scanned for recognizing colors contained in individual picture elements. The recognized color informations are then coded into a predetermined format for use in the pattern forming system as a pattern information. For such a color recognizing operation it is desired to achieve an improved color recognizing ability and an increased speed of operation.

According to the above-mentioned conventional method, a design of colored pattern attached around the drum surface is first divided into a number of picture elements having an area predetermined by, for example, the weaving plan and the color of each picture element is separated by use of optical filters into three primary colors-red, green and blue. These primary colors are then converted into corresponding digital values which form the color informations of each picture element. These digital values, or color informations, are now compared with the previously memorized reference digital values of the three primary colors contained in the preselected colored pattern, so that the individual color information can be regarded to indicate a primary color having a closest reference digital value.

A disadvantage involved in the foregoing conventional method is that it cannot be effected very rapidly because of its including the step of comparing the digital values. Another disadvantage is that, to attain an improved accuracy in the color recognition of each picture element, it necessarily requires a memory medium of increased capacity for handling an additional number of color informations coming from the areas immediately before and after the particular picture element to be recognized, therefore the increased information quantity resulting in the reduction in the processing speed so much. This latter disadvantage seems to be caused, basically, by the fact that the color informations are limited only to the three primary colors (red, green and blue) and, theoretically, resulted from adoption of such a color reproduction method wherein the actual colors of individual picture elements are regarded as one of the three primary colors, which are then composed into a colored pattern corresponding to the preselected original colored pattern.

SUMMARY OF THE INVENTION

It is therefore an object of this invention to provide a method for recognizing colors of a preselected colored pattern by comparing the spectrum distribution of the light transmitted through or reflected from individual picture elements of the preselected picture pattern with the spectrum distribution of a number of reference colors.

Another object of this invention will be to minimize the risk that the color information is scattered, lost or deformed as in the case of conventional color recognizing method. For this purpose this invention contemplates the use of said light spectrum distribution, or a fundamental factor of color recognition, to thereby attain an improved ability of mechanical color recognition.

Still another object of this invention is to provide an apparatus which can process the informations for recognizing a colored pattern in a highly accurate and rapid manner.

According to the invention, the colors of individual picture elements in a fabric pattern design are encoded by comparing the level of transmittance or reflectance of the picture element at preselected wavelengths with stored values representing a reference color to generate a multibit code indicative of the color of the picture element. A comparator used for this purpose incorporates an error either proportional to the wavelength or of constant value so that the output of the comparator will indicate indentity with the stored value if the input value for the picture element is within a certain range of the stored value.

These and other objects and advantages of this invention will be apparent from the ensuing description and drawings.

DESCRIPTION OF THE PREFERRED EMBODIMENTS

Figure 1:
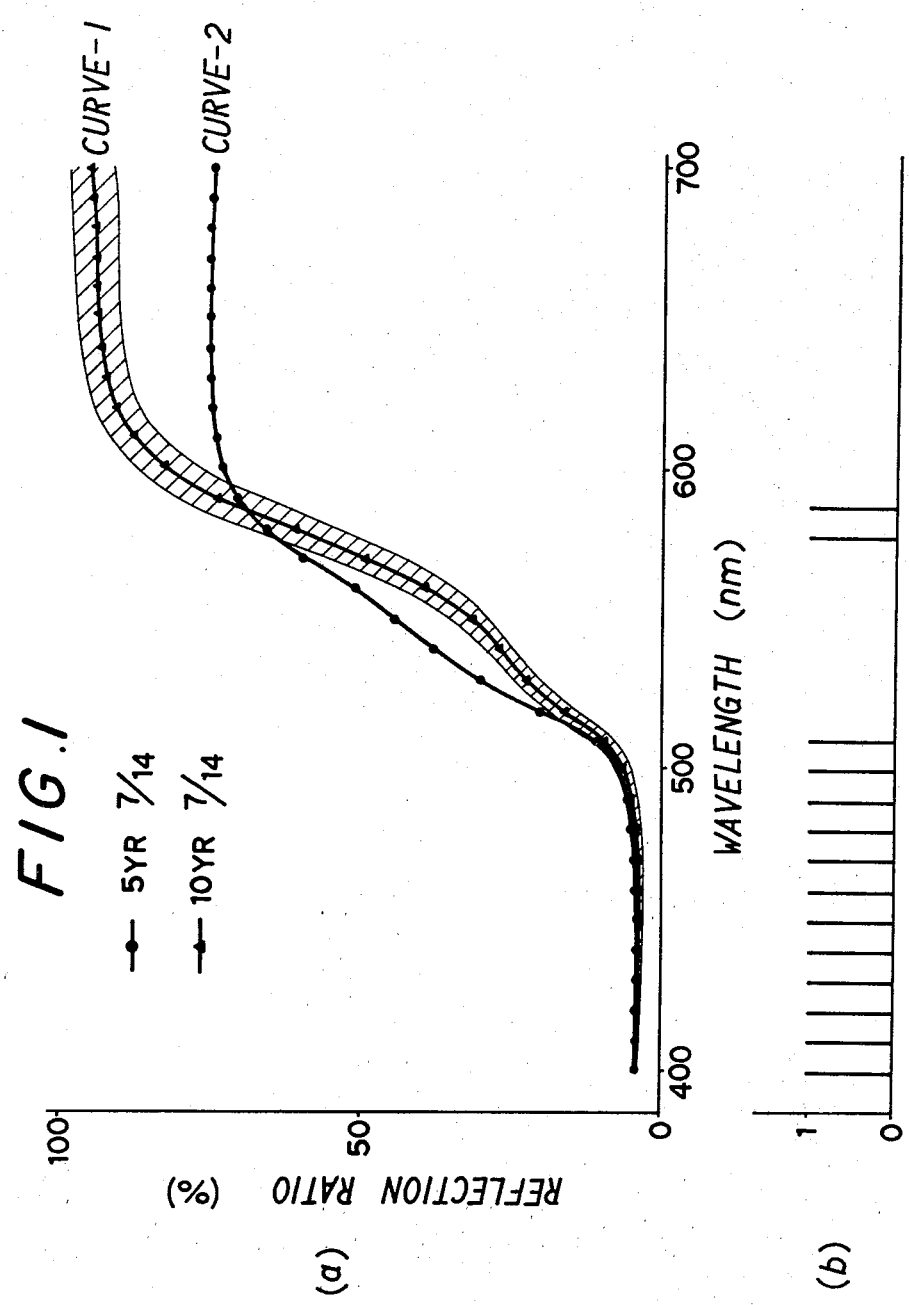
FIG. 1a is a diagram representing the spectrum distributions of two different colors.
FIG. 1b is a view for explaining the bit pattern obtained by comparing said two different colors.

FIG. 1a is a spectrum distribution diagram of two colors of red series (5YR 7/14, 10YR 7/14) obtained by sampling at intervals of 10 nm. In this diagram, Curve 1 represents the spectrum distribution data of a reference color 5YR 7/14 and Curve 2 represents the spectrum distribution data of a color 10YR 7/14 contained in a single picture element of a preselected colored pattern. The spectrum distribution data of a picture element contained of a colored pattern is generally obtained by sampling the spectrum distribution of the light transmitted through or reflected from the picture element at suitable intervals of wavelength. For example, giving a constant ratio R of each spectral reflectance as an allowable error to the spectrum distribution Curve 1 of reference color, a fuzzy zone as shown by oblique lines will appear on both sides of Curve 1. Comparing the spectral reflectances in such a fuzzy zone with the spectral reflectances on Curve 2 at corresponding wavelengths, then the spectral reflectances within the fuzzy zone of Curve 2 may be distinguished from those outside of the fuzzy zone and, accordingly, a bit pattern as shown in FIG. 1b may be obtained. Curves 1 and 2 may be compared with each other to recognize the colors of individual picture elements either by recognizing this bit pattern in the form of binary numbers or by distinguishing it by the number of on or off bits. The bit pattern is coded into a predetermined format, which is then applied to the pattern forming system as a pattern information.

It will be apparent from the foregoing if the reference data for the colors contained in the colored pattern to be color-separated and the values in fuzzy zone required for attaining a precision color recognition are given, then the colors can be distinguished with a much higher accuracy than can be attained by the conventional three-primary-color separation method, by measuring the spectral transmittance or reflectance of each picture element by scanning the colored pattern in a predetermined mechanical manner. The range of the fuzzy zone values can be selected freely depending on the desired accuracy of color recognition.

The fact that the color distinguishing accuracy can be varied over a wide range is advantageous in view of the following points. In weaving a jacquard fabric, for example, a technique is known for making complicated patterns with weaves of fabric which are formed of yarns of a single color by use of a preselected design painted with different shades. To exactly transfer the image of the design onto the woven fabric, it is required to distinguish the varying shades of single color with accuracy. Whereas in printing, it is known that a high quality printed cloth with varying shades can be obtained by suitably overlapping inks of a single color having different shades. A high precision color distinction is required also for carrying out this technique properly.

On the other hand, it is almost impossible to eliminate the unevenness of printing when a design is hand-printed. This is especially true for each picture element with an area of less than $0.5 \times 0.5$ mm$^2$. The ability that the fuzzy zone can be varied freely over a wide range is necessary also for compensating such an unevenness of painting of the design.

Figure 2:
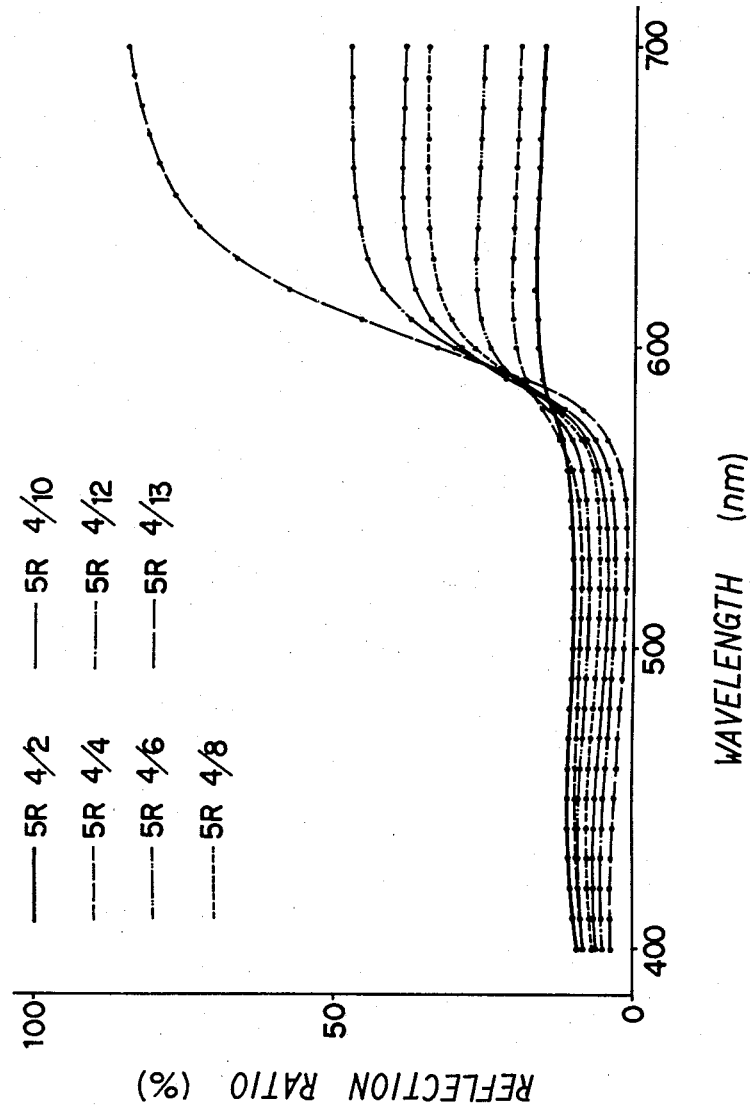
FIG. 2 is an illustrative diagram representing the spectrum distributions of several adjacent similar colors.

The fuzzy zone may be set either to a constant ratio R of the spectral transmittance or reflectance or to a constant value C. It will be understood that making a bit pattern similar to that shown in FIG. 1b by setting the fuzzy zone to the constant value C is very effective for distinguishing a color from quite similar colors as shown in FIG. 2.

Figure 3:
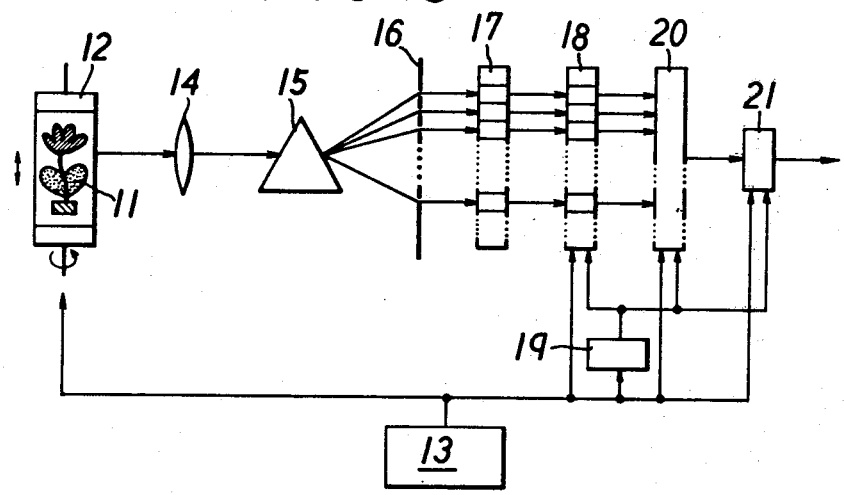
FIG. 3 is a block diagram of the apparatus according to one embodiment of this invention.

Illustrated in FIG. 3 is an apparatus according to one embodiment of this invention for effecting the foregoing method. With this apparatus, a colored pattern 11 is attached around a drum 12 which is rotated under control of a control unit 13. The size of individual picture elements composing the colored pattern is determined by the displacement of drum 12 relative to an optical system 14. The light from each picture element passes through the optical system 14 to reach a prism acting as a spectral apparatus 15, where the light is divided into several spectral regions to be sampled by a plate 16 having a required number of slits formed therein. Then the sampled light fractions are converted by a photoelectric converter 17 into electric signals corresponding to the spectral transmittances or reflectances which, in turn, correspond to the wavelengths of individual colors. Within a comparator 18, of which allowable error range has been set previously, the spectral transmittances or reflectances indicated by the photoelectric converter 17 are converted together with the spectral transmittances or reflectances of a number of reference colors previously memorized in a memory 19 into a bit pattern for comparison purpose. Depending on whether the spectral transmittance or reflectance indicated by the photoelectric converter 17 is within the allowable error range or not, a signal train of 1 or 0 is developed for distinguishing the color of individual picture element. This signal train is then converted into a recognized color code within a color code converter 20 to be applied as a pattern information from an output unit 21 to the pattern forming system.

The control unit 13 develops a synchronizing signal for thereby operating the drum 12, comparator 18, color code converter 20, memory 19 and output unit 21 in association with each other.

The foregoing apparatus may be operative as a color recognizing apparatus for use in printing. In this case, the output unit 21 may operate in such a manner that it provides a pattern information of only a single color present in the memory 19 to form a single color pattern. By developing a color code and its run length for each scanning line, the output unit 21 may also be operative in place of a pattern tape which is used in a pattern forming system. If the scanned spectral transmittances or reflectances are regarded as vector element, a method of comparing the vectors of multi-dimensional space may be employed for recognizing the pattern by comparing the Curve 1 with Curve 2 of FIG. 1a.

Figure 4:
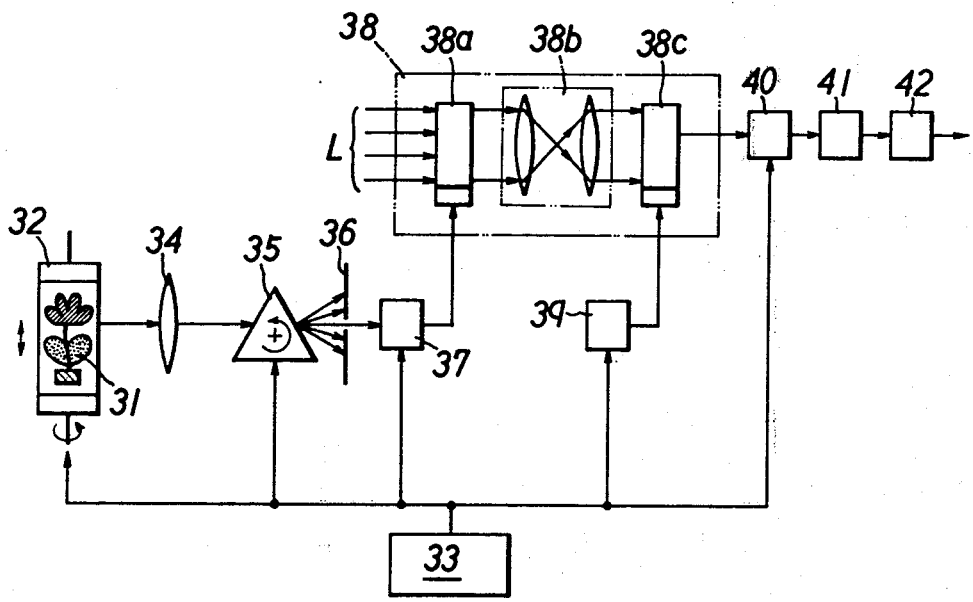
FIG. 4 is a block diagram of the apparatus according to another embodiment of this invention.

Referring to FIG. 4, here is shown an apparatus according to another embodiment of this invention. The drum 32 carrying a colored pattern 31 around its outer surface is driven under control of the control unit 33. The size of individual picture elements of the colored pattern is determined by the displacement of drum 32 relative to the optical system 34. The spectral apparatus 35 rotatable under control of the control unit 33 divides the light transmitted through or reflected from the individual picture element and coming through the optical system 34 into several spectral regions, which are then allowed to pass through a slit formed in the plate 36 one by one as the spectral apparatus 35 rotates and converted sequentially by the photoelectric converter 37 into corresponding electric signals.

The electric signals corresponding to the spectrum distribution of the color contained in the individual picture element are applied to an acousto-optic light modulator (or untrasonic light modulator) 38a of an optical real time correlation device 38 and converted into a laser beam L corresponding to the spectrum of light. The laser beam L is then applied to a light modulation element 38c after passing through a lens 38b.

To the light modulation element 38c are also applied sequentially the spectrum signals which are electric signals obtained by converting the spectrum informations of a number of reference colors and stored in the memory 39. Thus, the correlation between the light informations from the modulation element 38a and the color informations stored in the memory 39 is calculated in the light modulation element 38c. The result is detected by a photoelectric conversion element 40. The correlation image detected on the photoelectric conversion surface of said element 40 is then converted into corresponding color codes within a color code converter 41. When the color codes are developed from the output unit 42, the picture elements of the colored pattern attached around the drum 32 can be sequentially converted into an electric signal train for recording it in a recording medium such as punched tape.

Having thus described our invention, we claim:

1. A colored pattern recognizing method for use in forming a colored pattern in a woven fabric, comprising the steps of storing values indicative of the level of light at a plurality of preselected wavelengths for each of a plurality of reference colors, scanning a pattern design to detect the spectrum of light from each picture element of the pattern, sampling said spectrum for each picture element at preselected wavelengths and generating electrical signals indicative of the level of light at each of said preselected wavelengths, retrieving stored values for a reference color, comparing the electrical signal for a given picture element at each preselected wavelength with the corresponding stored values for a reference color, generating a multibit binary output indicative of whether each electrical signal for the picture element is substantially identical to the corresponding stored value.

2. The method of claim 1, wherein a signal is generated indicating agreement with a corresponding stored value when the electrical signal is within a predetermined range of said stored value.

3. The method of claim 2, wherein said predetermined range is a constant ratio relative to the wavelength.

4. The method of claim 2, wherein said predetermined range is a constant value.

5. Colored pattern recognizing apparatus for use in forming a code pattern in a woven fabric corresponding to a multielement colored pattern design, comprising spectral means for dividing the light from an individual picture element of the pattern into several spectral regions, means for sampling the level of light from said picture element at a plurality of selected wavelengths, means for sensing and converting the level of light at each preselected wavelength into a corresponding electrical signal, means for storing values representing light levels at said preselected wavelengths for a plurality of reference colors, comparator means operatively connected to receive outputs from said converting means and said storing means for comparing each electrical signal with a stored value for a reference color at the corresponding wavelength, said comparator means including means for producing a binary output indicating whether said electric signal is substantially identical to the corresponding stored value, color code converter means for converting the outputs of said comparator means into a color code, and control means for coordinating the foregoing functions such that stored values for the appropriate wavelength are retrieved and read out to the comparator means in sequence for each picture element.

6. The apparatus of claim 5, wherein said comparator means further includes means for determining a range about each stored value within which the electrical signal must fall to produce an output from said comparator.

7. The apparatus of claim 6, wherein said range is a constant ratio relative to the wavelength.

8. The apparatus of claim 5, wherein said range is a constant value.

* * * * *